United States Patent [19]

Hall

[11] 4,138,159
[45] Feb. 6, 1979

[54] ARTICLE CARRYING AND UNLOADING DEVICE

[76] Inventor: Thomas E. Hall, Rt. 2, Box 1210, St. Cloud, Fla. 32769

[21] Appl. No.: 822,630

[22] Filed: Aug. 8, 1977

[51] Int. Cl.² ............................................... B60P 1/16
[52] U.S. Cl. ..................................... 298/18; 214/501
[58] Field of Search .............. 298/8 R, 8 H, 8 T, 10, 298/17 R, 17 B, 18, 19 R, 19 V, 23 F, 23 DR, 38; 214/501, 314; 105/261 R, 275, 263, 274, 270, 272, 278

[56] References Cited

U.S. PATENT DOCUMENTS

| 318,170 | 5/1885 | Culverson | 105/278 X |
| 789,784 | 5/1905 | Balch | 298/18 |
| 2,661,235 | 12/1953 | Isachsen | 298/18 |
| 3,711,157 | 1/1973 | Smock | 298/8 R |
| 3,922,036 | 11/1975 | Kalsbeck et al. | 298/18 |
| 4,042,138 | 8/1977 | Arvidsson | 214/314 |

FOREIGN PATENT DOCUMENTS

| 256870 | 1/1928 | Italy | 298/18 |
| 365335 | 12/1962 | Switzerland | 214/314 |

Primary Examiner—Frank E. Werner

Attorney, Agent, or Firm—Duckworth, Hobby, Allen & Pettis

[57] ABSTRACT

An article carrying and unloading device primarily designed to transport and unload at specific locations large, substantially cylindrical bales of hay or the like. A support frame which may be in the form of a mobile trailer has one or more cradle assemblies pivotally connected to the support frame and, accordingly, movable between a carrying and an unloading position. At least one cradle support assembly is disposed in at least partially supporting relation between each cradle assembly and the support frame wherein this cradle support assembly is movable relative to the support frame by manipulation of a locking element allowing displacement of the one cradle assembly and thereby removal of a primary support such that gravity, and weight of the carried article, automatically forces the cradle assembly from its carrying to its unloading position. The mounted disposition of the cradle assembly in its carrying position is oriented to be slightly askewed such that the bale or article carried is maintained in a slightly weight biased position against one cradle side. This off-center weighted position services to automatically transfer the cradle assembly to its unloading position upon removal of the locking from the cradle support assembly associated with the cradle assembly.

6 Claims, 6 Drawing Figures

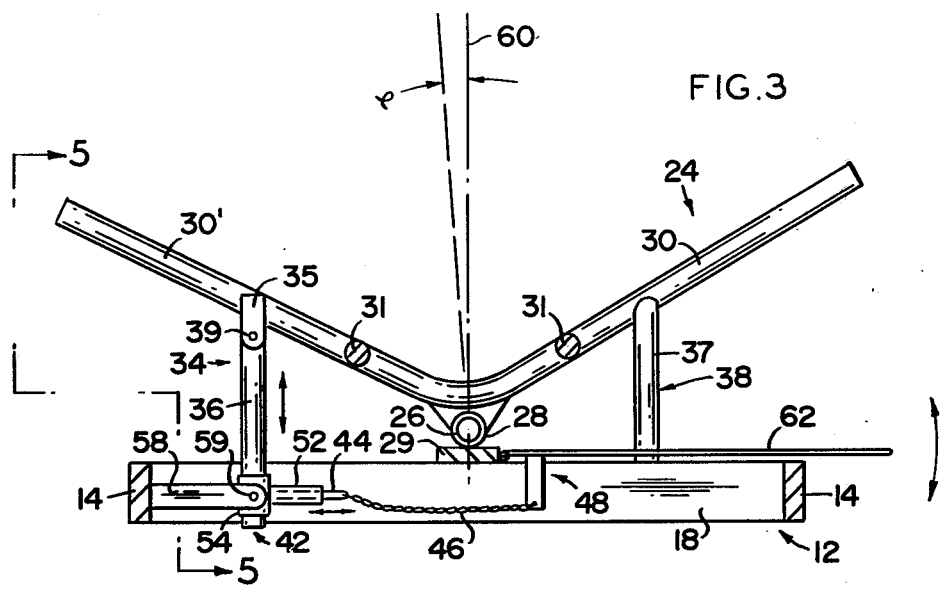
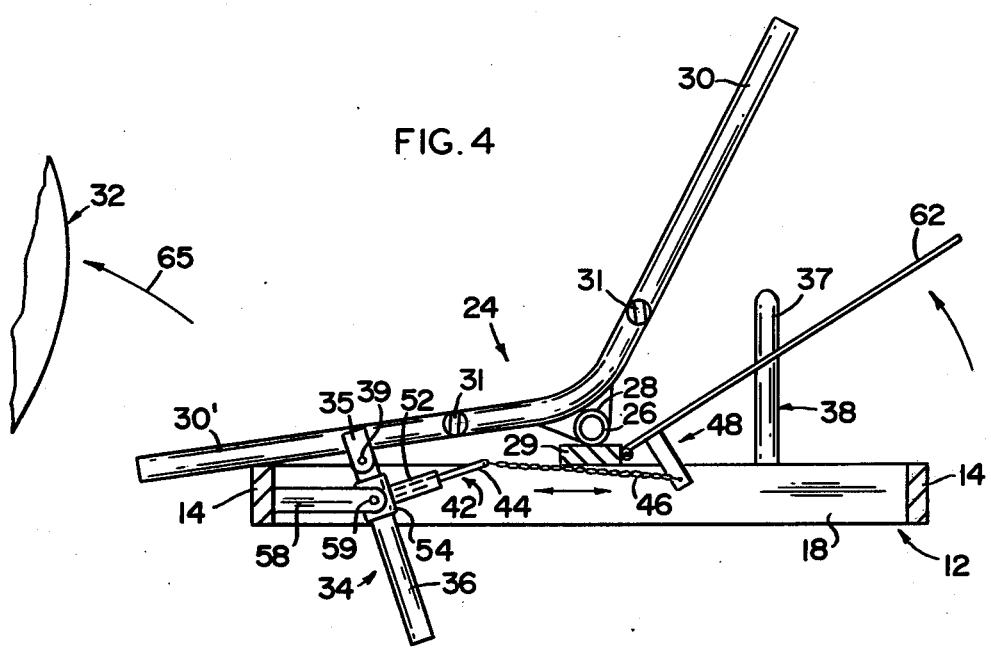
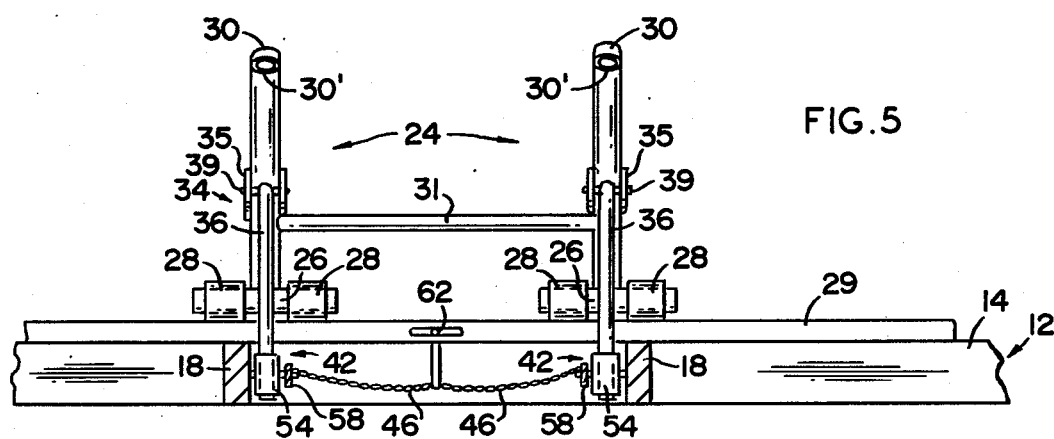

ARTICLE CARRYING AND UNLOADING DEVICE

BACKGROUND OF THE INVENTION

An article carrying and unloading device including a support frame which may be in the form of a mobile trailer of the type structure to be towed by a relatively conventional vehicle wherein one or more cradle assemblies are movably disposed on the trailer so as to maintain an article such as a bale of hay or the like in a secured position thereon and selectively upon the manipulation of certain activation means moving the bale to an unloading position off the side of the trailer or support frame.

DESCRIPTION OF THE PRIOR ART

In the farming and agricultural harvesting industry the gathering or harvesting of various agricultural products have frequently utilized specially designed or structured vehicles for the collecting and transporting of such products from the fields to a designated storage area.

In the beginning of organized farming, men merely used draft animals to transport the products from the fields to their storage shelter. As society became more mechanized, wagons, trailers and like devices were utilized. With the advent of modern farming techniques, products such as hay are presently formed in the field in relatively large, cylindrical "bales" weighing hundreds of pounds. Previous to this innovation, bales were normally formed in much smaller units capable of being handled by one or at the most two laborers. Such bales were lifted or transported to a trailer bed by mechanized means and thereby transported to the storage area or the like. However, due to the formation of the larger, substantially cylindrical bales weighing hundreds of pounds, the transporting of such bales has become a problem which is not effectively or efficiently solved by utilizing conventional carrying, transporting and/or unloading equipment.

In order to accomplish the effective handling of such larger bales there is ideally required an article carrying and unloading device specifically structured and configured to maintain each of the bales in a substantially upright position and under control during their carrying or transporting orientation. Similarly, such a device used to maintain and carry such bales must be specifically structured to accomplish the effective and efficient removal of such bales from the support frame or trailer on which the various cradle assemblies or bale carrying assemblies are mounted.

Ideally, the unloading should be accomplished in an efficient manner utilizing relatively simple, mechanized equipment without the need for unnecessarily complex hydraulic, hydrostatic or electronic controls for the positioning or orientation of the structures used to carry the large and rather cumbersome bales.

In addition, a preferred structure of an article carrying and unloading device of the type specifically designed to handle large bales of hay and like agricultural products should be durable, relatively inexpensive to purchase and maintain and be capable of efficiently and effectively operating under the intended conditions for harvesting and transporting such agricultural products.

SUMMARY OF THE INVENTION

This invention relates to an article carrying and unloading device of the type primarily designed to handle and transport large bales of hay or like agricultural products. Such article carrying and unloading device includes a support frame which, in the preferred embodiment, may be in the form of a mobile trailer designed to be towed behind a conventional vehicle. At least one and preferably a plurality of cradle assemblies are movably mounted on the support frame and positionable between an article carrying and unloading position.

Each of the cradle assemblies comprises a base portion pivotally mounted to the support frame and including two cradle sides extending substantially outwardly therefrom in an angular orientation relative to one another. The cradle sides are structured and configured such that the large bales of hay or similar type articles are supported therebetween when the cradle assembly is maintained in its substantially upright carrying position. Cradle support means include a first cradle support assembly disposed in movably interconnected and supporting relation between the support frame and one side of the cradle assembly. The cradle support means further includes a second cradle support assembly disposed on the opposite side of the base means of the cradle assembly and disposed in supporting engagement between the support frame and the opposite side to which it is correspondingly positioned.

An activation means in the form of a lever arm is pivotally connected to the support frame and interconnected to a locking assembly. The locking assembly in turn is disposed in interconnecting relation between the support frame and the first or at least one of the cradle support assemblies. Manual manipulation of the activation means, through linkage, serves to movably or removably disconnect a lock element of the locking assembly from a support leg incorporated in the first cradle support assembly. The disposition of the large bale of hay or article on the cradle assembly is such as to bias its weight against one of the cradle sides more than the other thereby forcing more weight to be supported by the first support cradle assembly which in turn is associated directly with the locking means. This biasing disposition of the article or bale of hay being carried is at least partially defined by the offset orientation of the cradle assembly which in turn may be attributable to the linear dimension of the first cradle support assembly being lesser than the linear dimension of the second cradle support assembly.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 3 is a front, sectional view showing the offset relation of one cradle assembly shown in its carrying position;

FIG. 4 is a sectional view showing details of one cradle assembly in its unloading position and cooperative activation of the activating means;

FIG. 5 is an end view, in partial section, taken along line 5—5 of FIG. 3 showing details of the cradle assembly.

Similar reference characters refer to similar parts throughout the several views of the drawings.

DESCRIPTION OF THE PREFERRED EMBODIMENT

Figure 1:
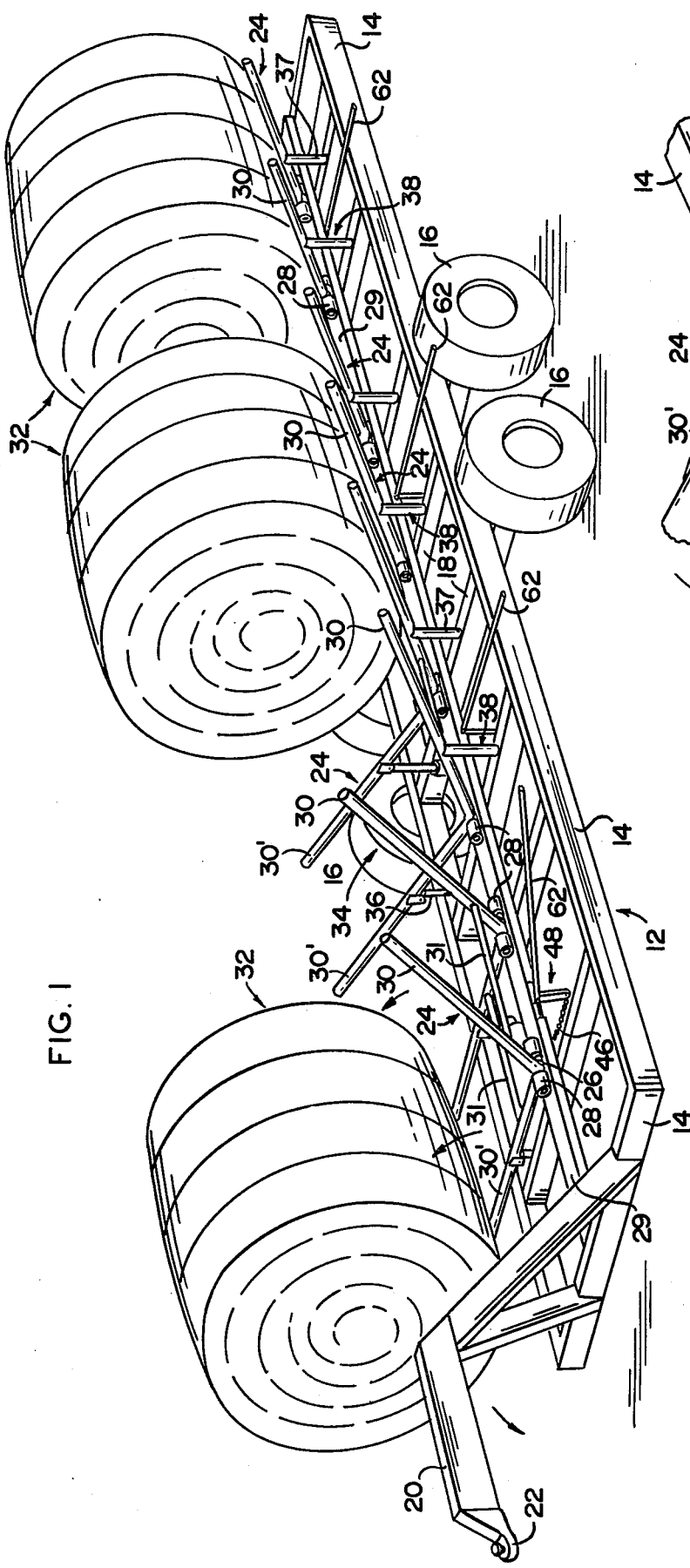
FIG. 1 is a perspective view of the support frame in the form of a trailer wherein at least one bale is shown mounted on a cradle assembly while another is shown disposed in its unloading position.
Figure 2:
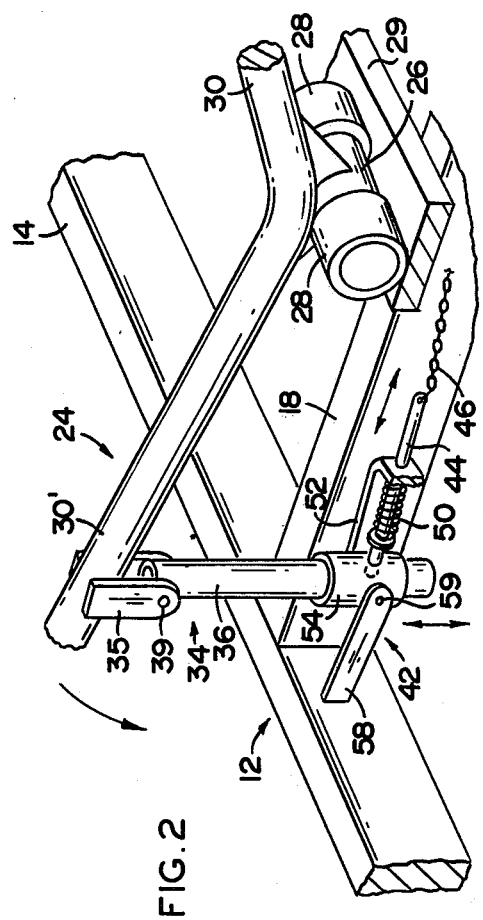
FIG. 2 is a detail view, in partial cutaway and section, showing details of the locking assembly.

As shown in FIG. 1, the article carrying and unloading device of the present invention comprises a support frame generally indicated as 12 which, in the preferred embodiment shown, includes a mobile trailer 14 movably supported on a given surface by running gear including a plurality of wheels 16 interconnected to the trailer 14 by axle assemblies 18. It should be noted that the support frame 12 may take other forms than a mobile trailer assembly 14 but, for the purpose of explanation and as representing the preferred embodiment, a mobile trailer is shown. Accordingly, a yoke element 20 is attached to the trailer 14 and includes a connection element designed designated to be connected to a standard hitch assembly which is in turn attached to the towing vehicle.

As shown in FIGS. 1, 3, 4 and 5, the device of the present invention further comprises at least one and depending upon the embodiment preferably a plurality of cradle assemblies generally indicated as 24. Each cradle assembly comprises base means 26 pivotally mounted to the frame or trailer 14 by the base portion rotatably mounted within sleeves 28. Sleeves 28 are fixedly attached to a support beam 29 or the like portion of the support trailer 14. A cradle assembly 24 further includes cradle sides extending outwardly from the base portion 26 and including side elements 30 interconnected to one another by cross beams 31. Each of the cradle sides defined by the side elements 30 are disposed in substantially outwardly extending, angular orientation relative to the base 26 so as to be particularly structured and defined to have supportedly mounted therein an article 32.

The device of the present invention further comprises cradle support means generally indicated as 34 (FIG. 3) and comprises a first cradle support assembly 36 and a second cradle support assembly 38 both of which are disposed in interconnecting relation between the respectively positioned sides of the cradle and the support frame or trailer 14. The first trailer support assembly 36 comprises a support leg interconnected at one end to one of the cradle side elements 30 by means of a brace 35 and attachment link 39. The second cradle support assembly 38 also includes a support leg 37 having one end substantially, fixedly attached to the frame or trailer 14 and the opposite end disposed to engage in supporting relation the cradle side element 30 when the cradle assembly 24 is disposed in its upright or carrying position (FIG. 3). Accordingly, it is readily seen that the first cradle support assembly is disposed in secured relation to the support trailer 14. Obviously, an opposite arrangement could be contemplated and still be covered within the scope of the present invention.

Figure 6:
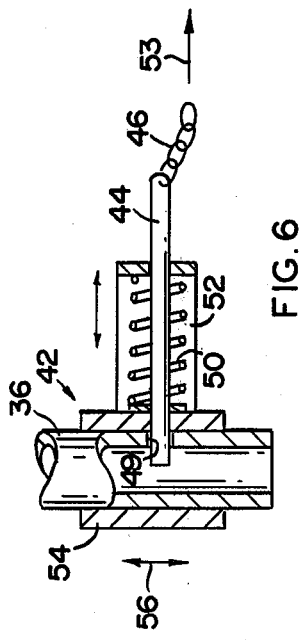
FIG. 6 is a detail view, in partial section, showing details of the locking assembly including the locking element associated with the cradle support means.

However, with further explanation regarding the first cradle support assembly 36, its interconnection to the locking assembly generally indicated as 42 (detailed FIG. 6) renders it movable relative to the support frame but yet be maintained in supporting relation to the cradle assembly 24 as long as the lock assembly 42 is in its locked position (FIG. 6).

With regard to FIG. 6, the locking assembly 42 comprises a locking element 44 interconnected by linkage means 46 to the activation assembly 48 (FIGS. 1, 3 and 4). The lock element is disposed in alignable relation with an aperture 49 formed in the support leg comprising the cradle support assembly 36 and is biased in this position due to biasing spring 50 disposed within bracket 52 and interconnected between bracket 52 and lock element 44 so as to bias the lock element 44 into locked engagement with the support leg of the cradle support assembly 36. Removal of this lock through movement of the linkage 46 in the direction indicated by directional arrow 53 causes movement of the lock element in the same direction and allows free relative movement between the leg of the cradle assembly 36 and the sleeve 54 in either direction indicated by directional arrow 56. The sleeve 54 may be pivotally attached to the remainder of the frame by brace 58 interconnected to sleeve 54 by pivot element 59.

With regard to FIG. 3, the disposition of the cradle assembly 24 and particularly the side elements 30, when the cradle assembly is in its upright position as pictured in FIG. 3, is oriented such that it is somewhat offset. In particular, a true symmetrical axis of the cradle assembly would be indicated by axis indication line 60. Due either to the disposition of the respective cradle support assemblies 36 and 38 or to their difference in longitudinal dimensions, the cradle assembly 24 is offset so as to be biased somewhat in the direction of the first cradle support assembly 36. Accordingly, the offset disposition of the cradle assembly 24 is indicated by some predetermined angle generally indicated as $\phi$. Accordingly, when an article 32 is disposed on the cradle assembly its weight is normally biased more towards the direction of the side elements 30'. This, of course, distributes the weight more against this side and puts more of the support burden on the first cradle support assembly 36. Thereby upon activation or pivoting of the activation means 48 in the form of movement of lever arm 62 will cause movement of the locking element 44 in the direction indicated by directional arrow 53 (FIG. 6). This will, of course, disengage the locking element 44 from the support leg of the first cradle support assembly 36 causing its downward movement relative to sleeve 54. This in turn, due to the biased weight of the article 32 on the cradle side 30', will cause the movement of the entire cradle assembly 24 to its unloading position as shown in FIG. 5. In this position the entire article or bale of hay 32 is easily rolled from or gravity disposed from the cradle assembly as indicated by directional arrow 65.

Accordingly, it is readily seen how the subject invention accomplishes both article carrying and unloading from the support frme or trailer 14 in a manner which is accomplished mechanically and more efficiently than certain prior art devices.

It will thus be seen that the objects set forth above, among those made apparant from the preceding description, are efficiently attained, and since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An article carrying and unloading device comprising in combination:
    a support frame;
    at least one carrier assembly movably connected to said support frame and including cradle means, said cradle means including a base portion pivotally connected to said support frame so as to permit movement of said cradle means between a carrying and an unloading position;
    said cradle means further including cradle sides connected to said base portion and extending substantially outwardly therefrom on opposite sides of said base portion;
    cradle support means interconnected between said support frame and at least one cradle side and in supporting relation to said one cradle side and, said cradle support means comprising
        a first cradle support assembly movably interconnected between said support frame and said one cradle side, said locking assembly removably connected to said first cradle support assembly and disposed relative thereto to define fixed and movable engagement between said frame and said first cradle support;
        a second cradle support assembly extending in cradle supporting engagement between a cradle side and said support frame and disposed on the opposite side of said base portion relative to said first cradle support assembly;
        said first and second cradle support assemblies extending outwardly from said support frame into supporting engagement with said cradle sides, said cradle sides thereby disposed in spaced relation to said support frame, said latter disposition defining the article carrying position; and wherein
        said first cradle support assembly includes an effective longitudinal dimension lesser than said second cradle support assembly, said cradle side associated with said second cradle support assembly being closer spaced to said support frame than the opposite cradle side, whereby the weight of an article on said cradle means is biased toward said first cradle support assembly; and
    unloading means interconnected between said frame and said cradle support means, said unloading means including a locking assembly movably interconnected between said cradle support means and said support frame and movably disposed relative to said cradle support means so as to allow the fixed and movable engagement between said cradle support means and said support frame, whereby said cradle means is transferrable between said carrying and said unloading position upon movable engagement between said cradle support means and said support frame.

2. An article carrying and unloading device as in claim 1 wherein said locking assembly comprises a lock element at least partially interconnected to the remainder of said locking assembly by a bias means disposed to direct said lock element into locking engagement with said first carrier means, activation means movably connected to said frame and interconnected to said lock element, said activation means movable to an activating position causing removal of said lock element from said first cradle support assembly and transfer of said cradle means from said carrying position to said unloading position whereby the bias position of the article on said cradle means causes automatic tilting of said cradle side associated with said first cradle support assembly into engagement with said frame thereby defining said unloading position.

3. An article carrying and unloading device as in claim 2 wherein said unloading assembly further comprises linkage means movably interconnecting said activation means to said lock element; said activation means comprises a lever arm pivotally interconnected between said support frame and said lock element, said lever arm disposed to cause disengagement of said lock element from said first cradle support assembly upon movement of said activation means into said activating position.

4. An article carrying and unloading device as in claim 1 wherein said first cradle support assembly comprises at least one support leg attached to one end of said cradle side and connectable to said locking assembly at a point along the length of said support leg spaced from said cradle side, said support leg disposed for sliding engagement relative to said frame along the length of said support leg.

5. An article carrying and unloading device as in claim 1 wherein said second cradle support assembly comprises at least one support leg fixedly attached to said support frame and extending upwardly therefrom into supporting engagement relative to one cradle side disposed opposite to said first cradle support assembly relative to said base portion.

6. An article carrying and unloading device as in claim 1 wherein said support frame defines at least a portion of a mobile trailer; said article carrying and unloading device comprising a plurality of said carrier assemblies mounted on said trailer in spaced apart, independent relation to one another.

* * * * *